United States Patent
Bindschedler et al.

(10) Patent No.: US 7,374,816 B2
(45) Date of Patent: May 20, 2008

(54) PREFABRICATED MEMBRANE BASED ON MODIFIED POLYURETHANE BITUMINOUS BINDER AND PROCESS FOR PRODUCTION

(75) Inventors: Pierre Etienne Bindschedler, Obernai (FR); Remi Perrin, Bischoffsheim (FR); Corinne Schall, Strasbourg (FR); Arnaud Nouri, Kogenheim (FR)

(73) Assignee: Soprema, Strasbourg (FR)

( * ) Notice: Subject to any disclaimer, the term of this patent is extended or adjusted under 35 U.S.C. 154(b) by 374 days.

(21) Appl. No.: 10/659,273

(22) Filed: Sep. 11, 2003

(65) Prior Publication Data
US 2005/0101210 A1    May 12, 2005

(30) Foreign Application Priority Data
Sep. 11, 2002    (FR)   ................... 02 11258

(51) Int. Cl.
*B32B 11/02*    (2006.01)
*B32B 11/10*    (2006.01)
*C08L 95/00*    (2006.01)

(52) U.S. Cl. ............... 428/423.1; 428/424.2; 428/489; 442/48; 442/59; 442/102; 442/136; 524/59; 524/62; 524/705; 106/273.1; 106/275; 106/277; 106/281.1; 106/282

(58) Field of Classification Search ............... 442/42, 442/59, 48, 102, 136; 428/423.1, 424.2, 428/489; 524/59, 62, 705; 106/273.1, 275, 106/277, 281.1, 282
See application file for complete search history.

(56) References Cited

U.S. PATENT DOCUMENTS

| | | | | | |
|---|---|---|---|---|---|
| 4,871,792 | A | * | 10/1989 | Lucke | ................... 524/59 |
| 4,994,508 | A | * | 2/1991 | Shiraki et al. | ................ 524/14 |
| 5,912,193 | A | * | 6/1999 | Iwata et al. | ................. 442/102 |
| 5,981,010 | A | * | 11/1999 | Terry et al. | ................ 428/40.1 |
| 6,021,620 | A | * | 2/2000 | Vermilion et al. | ......... 52/741.4 |
| 6,271,305 | B1 | * | 8/2001 | Rajalingam et al. | ........ 524/705 |

FOREIGN PATENT DOCUMENTS

| | | |
|---|---|---|
| DE | 20 40 960 | 2/1972 |
| EP | 0 205 769 | 12/1986 |
| GB | 1 314 352 | 4/1973 |
| WO | WO 97 03253 | 1/1997 |
| WO | WO 00 11111 | 3/2000 |
| WO | WO 03/070829 | 8/2003 |

* cited by examiner

*Primary Examiner*—Ula C Ruddock
(74) *Attorney, Agent, or Firm*—Young & Thompson

(57) ABSTRACT

The present invention has for its object a prefabricated sealing membrane formed by a support, coated on at least one surface, and preferably impregnated throughout, with a modified bitumen base composition, characterized in that the thermoplastic bituminous composition for coating and/or impregnation is a bituminous binder modified by a thermoplastic polyurethane having the following weight proportion:

40 to 90% bitumen,
  10 to 50% thermoplastic polyurethane,
  0 to 10% aromatic oil,
  0 to 50% filler,
  0 to 0.5% catalyst.

15 Claims, No Drawings

PREFABRICATED MEMBRANE BASED ON MODIFIED POLYURETHANE BITUMINOUS BINDER AND PROCESS FOR PRODUCTION

BACKGROUND OF THE INVENTION

The present invention relates to flexible prefabricated sealing membranes based on bituminous binder used principally to seal the roofs of buildings, works of art or the like, and has for its object such a membrane based on modified polyurethane bituminous binder, as well as its process for production.

DESCRIPTION OF THE RELATED ART

There have been known for numerous years membranes that are bituminous based modified by polymers of the SBS (Styrene Butadiene Styrene) type or PPA (Polypropylene Atactique), which have been widely used from the 1970s in the sealing of terrace roofs.

The modification of the bitumens from refineries by direct distillation is a requirement. Thus, the conventional bitumens used particularly in the roadway industry have softening points of the order of 40° C. and from –5° C. are hard and break light glass.

However, these temperatures of use are too limiting for use in roofing in the scope of which the range of temperature as a function of climate varies between –40° C. and 110° C.

It is thus necessary to modify the bitumen. The conventional techniques consist in modification by thermoplastic polymers of the type for example of block elastomers [SBS, SEBS (for Styrene Ethylene Butadiene Styrene), . . . ] or plastomers [Polyolefin of the type of PPA, EVA, PPI, APAO (for amorphous a polyolefin)].

Thus, by SBS modification, there can be obtained a bituminous binder having a softening point of the order of 125° C. and flexibility at a low temperature of the order of –30° C. The range of use of a binder modified by plastomer polymers is generally comprised between –15° C. and 150° C.

However, membranes made from bituminous binder modified by the mentioned polymers have their limits: these polymers are sensitive to UV and, because of this, the last layer (the visible layer) requires a specific supplemental protection against attack by UV.

This protection, when it is integrated into the prefabricated membrane, is at present provided either by metallic flakes (aluminum, copper or stainless steel), or by flakes or granules of slate or mica sprinkled on the surface during the production process. These so-called "autoprotective" protections entail an extra weight that can range up to 1.5 kg/m², representing up to 30% by weight of the membrane and increasing the price of the final membrane.

In addition to UV, these known mentioned products age rapidly relative to the lifetime of their structures and degrade by oxidation, thereby failing to provide suitable sealing for a long period of time. Resealing thus is necessary on the average every 15-20 years.

For several years there have been developed modified polyurethane bituminous coatings. These products have above all an application in road coverings and the sealing of works of art and buildings. The known products of this type are namely:

applicable cold: the product is present in liquid form, mono or bicomponent, and attains its characteristics once crosslinked.

applicable hot: the polymerization takes place in the hot bitumen just before its application to the worksite.

For example, French patent No. 2 064 750 discloses a thermoplastic bituminous binder containing up to 10% of polyurethane. The polyols used have functionalities greater than 2, up to 8. The binder keeps its thermoplastic properties because of the low proportion of polymer.

This process described in the French patent mentioned above requires a mixture at the worksite at high temperatures that can reach 200° C.

Moreover, from European patent application No. 1 013 716 of Dec. 23, 1999 in the name of the applicant, there is known a monocomponent liquid composition that is based on bitumen and polyurethane, applicable cold to a support to be sealed.

However, the known products from the French and European applications mentioned above are not adapted for the production of membranes prefabricated in a factory.

From the document WO 97/03253 is known a sheet material forming a barrier against moisture and comprising a layer of a mixture of bitumen/polyurethane spread on a polymeric film and covered with a detachable film.

The polymer film ensures protection of the bituminous layer against external agents, particularly against UV, and said bituminous layer has the properties of cold adhesivity and does not need to be reheated before application of the sheet material.

SUMMARY OF THE INVENTION

The problem solved by the present invention consists in providing a prefabricated sealing membrane based on modified bituminous binder, that can be produced in an industrial manner according to the current techniques of spreading or impregnation, such as calandering (if desired slightly modified), adapted to be softened by heating before emplacement without modification of its characteristic, having a high stability against UV (ultraviolet) and a high resistance to oxidation and aging and being exposed to atmospheric and climatic aggressive agents.

To this end, the invention has for its object a prefabricated sealing membrane formed by a support or reinforcement, such as one or several backings that are fibrous or not, coated on at least one surface, and preferably impregnated throughout (which is to say over all its thickness), with a modified bitumen base composition, characterized in that the thermoplastic coating and/or impregnation bituminous composition is a bituminous binder modified by a thermoplastic polyurethane having the following weight proportion:

40 to 90% bitumen,
10 to 50% thermoplastic polyurethane,
0 to 10% aromatic oil,
0 to 50% filler,
0 to 0.5% catalyst.

The basic idea of the invention thus consists in providing a reinforced membrane based on bituminous binder modified by a thermoplastic polyurethane. The membrane will preferably be applied at the workplace by torch welding or by hot air: the product (which is to say the thermoplastic bituminous composition) softens under the action of the heat and retains all its properties after cooling. The membrane could also be applied by total cementing (cold for example), by strips or by points.

This type of modified binder, given the chemical nature of the polyols and isocyanates used in the synthesis of polyurethane, has the advantage of being stable to UV and very little sensitive to oxidation.

Thus, the molecules used will not contain double carbon-carbon bonds and the polyols used will not comprise ethylene linkages.

Moreover, as a function of the polyols and isocyanates used and the quantities of polymer used, it is possible to obtain products having different characteristics, if desired adjusted by selected additives for this purpose.

The synthesis of TPU (thermoplastic polyurethanes) is known to those in the art and widely described in the specialized literature. It can be carried out either by the so-called "one shot" way or by the prepolymer way.

As indicated above, the coating binder is principally constituted by bitumen of the TPU type. These could also contain fillers which permit decreasing the cost, aromatic or naphthenic oil so as to improve the cold properties and a catalyst or any other additive permitting improving its initial performance: fire resistance, resistance to roots, adhesion.

DESCRIPTION OF THE PREFERRED EMBODIMENTS

According to a preferred embodiment of the invention, the bituminous composition for coating and/or impregnation has the following weight proportion:

60 to 80% bitumen,
15 to 40% thermoplastic polyurethane,
0 to 5%, preferably 0 to 3%, aromatic oil,
0 to 40%, preferably 0 to 20%, filler,
0 to 0.5% catalyst.

In accordance with a preferred and optimized embodiment, the mentioned formulation could if desired be defined as follows:

60 to 80% bitumen,
20 to 30% thermoplastic polyurethane,
0 to 2% aromatic oil,
10 to 20% filler,
0 to 0.2% catalyst.

Moreover, according to an additional advantageous characteristic of the invention, the bituminous coating and/or impregnation composition also contains between 0.01 and 20% by weight of one or several additives improving adhesion, resistance to fire or to flames and/or resistance to roots, of said composition.

The content of additives can vary as a function of the additional property or properties which the composition should have.

Generally, said content is of the order of 1% by weight.

The bitumen used is preferably a direct distillation bitumen. As a function of the desired characteristics for the binder and the membrane, there will be selected a more or less soft bitumen. The bitumens 70/100 and 180/220 are particularly suitable.

The thermoplastic polyurethane, whose prepolymer can if desired be prepared in advance, is obtained from diisocyanate of a functionality substantially equal to 2, of polyol of a functionality substantially equal to 2, and of a chain lengthening agent.

Preferably, the functionality of the polyol is comprised between 1.95 and 2.05 and that of the isocyanate between 2.0 and 2.1.

The isocyanate can be selected from isocyanates of a functionality substantially equal to 2, preferably there will be selected an aromatic isocyanate, for example an MDI or a TDI.

The polyol could be selected from polyesters, polyethers and polycarbonates of a functionality substantially equal to 2 and of molecular weights of 1000 to 5000, preferably comprised between 1000 and 3000. These polyols could be used alone or in combination, which is to say mixed together.

The chain lengthener is a diol of a molecular weight comprised between 50 and 500. The lengtheners currently employed are 1,4-butanediol, hexanediol, neopentylglycol, 2-ethyl, 1,3-hexanediol.

The thermoplastic polyurethane is preferably constituted by a quantity of hard segments (% by weight isocyanate +% by weight chain lengthener) comprised between 10 and 40%, preferably between 10 and 30%, and the ratio of isocyanate/polyol is comprised between 1.0 and 1.1 and is preferably about 1.05. The catalyst could be selected from catalysts currently used in the synthesis of polyurethanes and known to those skilled in the art.

The filler will be selected from mineral fillers such as chalk, silica, talc, dolomite, kaolin and possible mixtures of at least two of these substances.

The present invention also has for its object a process for the industrial production of a sealing membrane as described above.

According to a first embodiment of such a process, the polymer is synthesized separately, under conventional reaction conditions: agitation under inert atmosphere for 45 to 120 minutes, temperature of 80 to 90° C. The prepolymer is then introduced into the heated bitumen at a temperature higher than its melting temperature, so as to obtain a fluent and homogeneous mass. There is then added the chain lengthening agent and finally the catalyst and if desired the other components. According to the polyols used, the quantity of catalyst and the mixing temperature, the duration of the reaction varies between 15 and 120 minutes, during which the resulting mixture is heated and preferably intermittently or continuously, until polymerization. The final temperature of the binder can reach 180° C. to permit complete polymerization and to have a sufficiently fluent mass.

According to a second embodiment of such a process for production, the synthesis of the polyurethane can take place entirely in situ in the bitumen (synthesis in a single pass). The bitumen is thus brought to its melting temperature, preferably to 100° C. The polyols and isocyanates are added and the mixture is agitated to obtain about the theoretical NCO quantity (between 60 and 120 minutes). There are then added the chain lengthening agent, the catalyst and, as the case may be, the rest of the components. The temperature of the final mixture obtained is increased progressively to 180° C. with intermittent or continuous agitation, to preserve a fluent mass and to permit complete polymerization.

According to the type of bitumen, it can be that the latter, because of the presence of reactive groups in the fraction of asphaltenes, consumes a portion of the isocyanates. It is then necessary, in the case of the synthesis of the prepolymer in the bitumen (synthesis in one pass), to take account of this reactivity and to adjust the quantity of isocyanate to be used.

The hot and fluid modified bituminous composition obtained, which has a weight composition as set forth above, is then applied, for example by coating (for example with a scraper) then calendaring, in a layer on a support such as fibrous backing that moves past to be coated and impregnated. At this point, the final temperature of the bituminous composition, before application, is comprised between 160° C. and 185° C., preferably 165° and 180° C.

By way of non-limiting example of the invention, there is described hereafter in detail a possible practical process for production of a membrane according to the invention.

Synthesis of the Prepolymer:

Mix 500 parts of polyester of molecular weight 3000 with 200.75 parts of monomeric MDI, under nitrogen atmosphere and at 80/90° C. for 90 minutes (theoretical quantity of NCO: 7.63%).

Production and Application of the Modified Binder:

To 250 parts of bitumen 180/220 heated to 120° C., add 57.8 parts of prepolymer as prepared above. Mix for 5 minutes. Add 4 parts of 1.4-BDO and mix for 5 minutes. Increase the temperature of the mixture to 150° C. Add 0.05 parts of DBTL and continue heating. After 10 minutes of mixing, the temperature has reached 170° C. The mixture is withdrawn from the heat and applied as a film of 2 mm on the support backing.

Tests are carried out to determine the TBA, the penetration at 25° C., the Theological properties with a range of temperatures, the cold flexibility and the mechanical characteristics by direction traction.

Results of these measurements are the following:

TBA: 150° C.
Penetration 25; 54/10 mm,
Pliability: −20° C.,
Mechanical characteristics: 0.74 Mpa of force at rupture and 200% elongation,
Rheology: rubber plate between 30 and 150° C., maximum tan_delta: 10° C., max G": −20° C.
Quantity of hard segments: 34%—NCO/OH: 1 006

Of course, the invention is not limited to the described embodiments. Modifications remain possible, particularly as to the construction of the various elements or by substitution of technical equivalents, without thereby departing from the scope of protection of the invention.

The invention claimed is:

1. A prefabricated sealing membrane, having high stability to UV exposure and formed of a support or reinforcement, the support or reinforcement being one of coated on at least one surface and impregnated throughout, with a modified bitumen base composition, characterized in that the thermoplastic bituminous coating and or impregnation composition is a bituminous binder modified by a thermoplastic polyurethane having the following weight proportion:
   60 to 80% bitumen,
   15 to 40% thermoplastic polyurethane,
   0 to 5% aromatic oil,
   0 to 40% filler,
   0 to 0.5% catalyst,
   the modified bituminous binder adapted to be softened by reheating and recover its properties after subsequent cooling,
   the prefabricated membrane being adapted for application by heating by torch welding or hot air,
   the prefabricated sealing membrane highly stable to UV exposure, wherein
   the thermoplastic polyurethane is obtained from a diisocyanate of a functionality substantially equal to 2, a polyol of functionality substantially equal to 2, and a chain elongation agent,
   the polyurethane molecules are free of double carbon-carbon bonds, and
   the polyols are free of ethylene linkages.

2. The membrane according to claim 1, characterized in that the bituminous composition has the following weight proportion:
   60 to 80% bitumen,
   20 to 30% thermoplastic polyurethane,
   0 to 2% aromatic oil,
   10 to 20% filler,
   0 to 0.2% catalyst.

3. The membrane according to claim 1, characterized in that the bituminous composition contains also between 0.01 and 20% by weight of one or several additives improving adhesion, resistance to fire or to flames and/or resistance to roots, of said composition.

4. The membrane according to claim 1, characterized in that the thermoplastic polyurethane is constituted by a quantity of hard segments comprised between 10 and 40%.

5. The membrane according to claim 1, characterized in that the material or materials forming the filler is or are selected from the group of mineral fillers formed by chalk, silica, talc, dolomite, kaolin and mixtures of two or several of these substances.

6. The membrane of claim 1, wherein,
   the support or reinforcement comprises plural fibrous backings impregnated throughout.

7. The membrane of claim 1, wherein,
   the support or reinforcement comprises a coated fibrous backing.

8. The membrane of claim 1, wherein,
   the functionality of the polyols is between 1.95 and 2.05, and
   the functionality of the isocyanates is between 2.0 and 2.1.

9. The membrane of claim 8, wherein a ratio of isocyanate/polyol is between 1.0 and 1.1.

10. The membrane of claim 1, wherein a ratio of isocyanate/polyol is about 1.05.

11. A prefabricated sealing membrane having high stability, to UV exposure, comprising:
   a support in the form of a fibrous backing; and
   a modified bitumen base composition applied to a surface of the support or impregnated throughout the support,
   the modified bitumen base composition comprising
   60 to 80% bitumen,
   15 to 40% thermoplastic polyurethane,
   0 to 5% aromatic oil,
   0 to 40% filler, and
   0 to 0.5% catalyst,
   the modified bituminous base composition being thermoplastic, softening under action of heat and recovering its properties after subsequent cooling, and
   the prefabricated sealing membrane being adapted for application by torch welding or hot air and highly stable to UV exposure, wherein,
   the thermoplastic polyurethane comprises a diisocyanate, a polyol, and a chain lengthening agent,
   the thermoplastic polyurethane molecules are free of double carbon-carbon bonds,
   the polyols are free of ethylene linkages,
   the functionality of the polyols is between 1.95 and 2.05, and
   the functionality of the isocyanates is between 2.0 and 2.1.

12. The membrane of claim 11, wherein a ratio of isocyanate/polyol is between 1.0 and 1.1.

13. The membrane of claim 11, wherein a ratio of isocyanate/polyol is about 1.05.

14. The membrane of claim 11, wherein the modified bitumen base composition comprises 20 to 30% thermoplastic polyurethane.

15. A prefabricated sealing membrane having high stability to UV exposure, comprising:
   a support; and
   a modified bitumen base composition applied to the support, the modified bitumen base composition comprising 60 to 80% bitumen, 15 to 40% thermoplastic polyurethane, comprising a diisocyanate, a polyol, and a chain lengthening agent, 0 to 5% aromatic oil, 0 to 40% filler, and 0 to 0.5% catalyst, the modified bituminous base composition being thermoplastic, softening under action of heat and recovering its properties after subsequent cooling so that the prefabricated sealing membrane is suitable for application by torch welding or hot air, and the prefabricated sealing membrane being highly stable to UV exposure, wherein, the thermoplastic polyurethane molecules are free of double carbon-carbon bonds, the isocyanate and polyol are present in a ratio of isocyanate/polyol is between 1.0 and 1.1, the polyols are free of ethylene linkages, and the functionality of the polyols is between 1.95 and 2.05.

* * * * *